(12) United States Patent
Oikawa et al.

(10) Patent No.: US 11,167,566 B2
(45) Date of Patent: Nov. 9, 2021

(54) DEVICE AND METHOD OF APPARATUS HANDLING DESCRIPTION BY THE DEVICE

(71) Applicant: SEIKO EPSON CORPORATION, Tokyo (JP)

(72) Inventors: Hideki Oikawa, Shiojiri (JP); Seiji Tanaka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 565 days.

(21) Appl. No.: 15/759,033

(22) PCT Filed: Sep. 5, 2016

(86) PCT No.: PCT/JP2016/004046
§ 371 (c)(1),
(2) Date: Mar. 9, 2018

(87) PCT Pub. No.: WO2017/047040
PCT Pub. Date: Mar. 23, 2017

(65) Prior Publication Data
US 2020/0223233 A1     Jul. 16, 2020

(30) Foreign Application Priority Data
Sep. 14, 2015  (JP) .............................. JP2015-180774

(51) Int. Cl.
*B41J 3/407*     (2006.01)
*B41J 29/42*     (2006.01)
*G06F 3/0488*    (2013.01)

(52) U.S. Cl.
CPC ............. *B41J 3/4075* (2013.01); *B41J 29/42* (2013.01); *G06F 3/0488* (2013.01)

(58) Field of Classification Search
CPC ...................................................... B41J 3/4075
(Continued)

(56) References Cited

U.S. PATENT DOCUMENTS

| 8,994,965 B2* | 3/2015 | Motosugi | .............. | G06F 3/0321 |
| | | | | 358/1.13 |
| 2003/0165048 A1* | 9/2003 | Bamji | ................... | G06F 1/1626 |
| | | | | 361/679.21 |

(Continued)

FOREIGN PATENT DOCUMENTS

| JP | 2001-356928 A | 12/2001 |
| JP | 2004-351872 A | 12/2004 |

(Continued)

OTHER PUBLICATIONS

International Search Report dated Nov. 22, 2016 in PCT/JP2016/004046 with English-language translation (4 pgs.).

*Primary Examiner* — Anthony H Nguyen
(74) *Attorney, Agent, or Firm* — Chip Law Group

(57) ABSTRACT

A method of apparatus handling description by a device executing simulation processing that includes a step of displaying an operation unit image, which is an image of an operation unit of an apparatus including the operation unit, by a device display unit, a step of detecting an operation of the operation unit image by a detection unit, and a step of displaying an operation image, which is an image resulted from operation of the apparatus by an operation of the operation unit based on detection of an operation of the operation unit image, by the device display unit.

8 Claims, 16 Drawing Sheets

(58) Field of Classification Search
USPC .......................................................... 400/61
See application file for complete search history.

(56) References Cited

U.S. PATENT DOCUMENTS

| | | |
|---|---|---|
| 2005/0007606 A1 | 1/2005 | Miyasaka |
| 2008/0088590 A1* | 4/2008 | Brown .................. G06F 3/0238 345/168 |
| 2009/0019399 A1* | 1/2009 | Matsunaga ......... G06F 3/04817 715/838 |
| 2009/0251416 A1* | 10/2009 | Fujii .................. H04N 1/00408 345/168 |
| 2013/0194631 A1* | 8/2013 | Anezaki ............. H04N 1/00384 358/1.15 |
| 2015/0156352 A1* | 6/2015 | Ichiyama ........... H04N 1/00405 358/1.15 |
| 2015/0170539 A1* | 6/2015 | Chica Barrera ....... G09B 19/24 434/234 |
| 2017/0076634 A1* | 3/2017 | Hoss ...................... G09B 23/30 |
| 2017/0262045 A1* | 9/2017 | Rouvinez ................ G06F 3/011 |
| 2018/0004387 A1* | 1/2018 | Ochi ..................... G06F 3/0416 |

FOREIGN PATENT DOCUMENTS

| | | |
|---|---|---|
| JP | 2009-253946 A | 10/2009 |
| JP | 2010-185994 A | 8/2010 |
| JP | 2010-218314 A | 9/2010 |

* cited by examiner

DEVICE AND METHOD OF APPARATUS HANDLING DESCRIPTION BY THE DEVICE

CROSS REFERENCE TO RELATED APPLICATIONS

This application is a National Stage Entry of PCT/JP2016/004,046, filed Sep. 5, 2016; which claims priority to Japanese Patent Application No. 2015-180774 filed on Sep. 14, 2015, the entire contents of both of which are incorporated by reference herein.

TECHNICAL FIELD

The present invention relates to a device that describes handling of an apparatus, a method of apparatus handling description by a device, and a program.

BACKGROUND ART

An image forming apparatus that displays an operation manual is known in the related art. The image forming apparatus displays a chapter of the operation manual related to a key operated by a user. For example, the image forming apparatus displays a chapter "To copy" of the operation manual when a "copy" key is operated, and displays a chapter "To select magnification manually" of the operation manual when a magnification key is operated (refer to PTL 1).

CITATION LIST

Patent Literature

PTL 1: Japanese Unexamined Patent Application Publication No. 2010-185994

SUMMARY OF INVENTION

Technical Problem

The present inventor has found out the following problems.

For example, even in a case where an apparatus is not at hand such as before purchase of the apparatus, a user can check an operating method of the apparatus to a certain extent by reading an operation manual of the apparatus. However, in this case, even when the user has read the apparatus manual, it is difficult to experience the usability of the apparatus first hand since the apparatus is not actually operated.

An object of the invention is to provide a method of apparatus handling description by a device, a device, and a program, all of which can cause a user to experience the usability of an apparatus even in a case where the apparatus is not in a user's hand.

Solution to Problem

According to the invention, there is provided a method of apparatus handling description by a device executing simulation processing that includes a step of displaying an operation unit image, which is an image of an operation unit of an apparatus having the operation unit, by a device display unit, a step of detecting an operation of the operation unit image by a detection unit, and a step of displaying an operation image, which is an image resulted from operation of the apparatus by an operation of the operation unit based on detection of an operation of the operation unit image, by the device display unit.

According to the invention, there is provided a device including a device display unit that displays an operation unit image, which is an image of an operation unit of an apparatus having the operation unit, and an operation image, which is an image resulted from operation of the apparatus by an operation of the operation unit, and a detection unit that detects an operation of the operation unit image. The device display unit displays the operation image when the detection unit detects the operation of the operation unit image in a state where the operation unit image is displayed by the device display unit.

According to the invention, there is provided a program causing a computer to execute each step in the method of apparatus handling description by a device.

In this configuration, a user can perform an operation of the operation unit image displayed on the device display unit as in the case of performing an operation of the operation unit. In addition, through the operation image displayed on the device display unit, a user can check how the apparatus operates in a case where an operation of the operation unit is performed. Therefore, according to the configuration, even in a case where the apparatus is not in a user's hand, a user can experience the usability of the apparatus first hand.

In the method of apparatus handling description by a device, it is preferable that the operation unit have a letter input unit that receives an operation of inputting a letter, the apparatus further have an apparatus display unit that displays the letter input by an operation of the letter input unit, in the step of displaying the operation unit image, a letter input unit image, which is an image of the letter input unit and receives the operation of inputting a letter, be included in the operation unit image displayed by the device display unit, and in the step of displaying the operation image, a display unit image, which is an image of the apparatus display unit and in which the letter input by an operation of the letter input unit image is displayed, be included in the operation image displayed by the device display unit.

In this configuration, a user can perform an operation of inputting a letter with respect to the letter input unit image displayed on the device display unit as in the case of performing an operation of inputting a letter with respect to the letter input unit. In a case where an operation of inputting a letter with respect to the letter input unit in the apparatus is performed, a user can check how the input letter is displayed on the apparatus display unit through the display unit image displayed on the device display unit. Therefore, according to the configuration, even in a case where the apparatus is not in a user's hand, a user can experience the operability of inputting a letter with respect to the apparatus first hand.

In this case, it is preferable that the operation unit further have a printing instruction unit that receives an operation of instructing printing execution, the apparatus further include a printing unit that prints the letter input by the operation of the letter input unit by an operation of the printing instruction unit, in the step of displaying the operation unit image, a printing instruction unit image, which is an image of the printing instruction unit and receives an operation of instructing creation of a printed matter image that is an image of a printed matter on which the letter is printed by the printing unit, be included in the operation unit image displayed by the device display unit, and in the step of displaying the operation image, the printed matter image, which is created by an operation of the printing instruction unit image, be included in the operation image displayed by the device display unit.

In this configuration, a user can perform an operation of the printing instruction unit image displayed on the device display unit as in the case of performing an operation of the printing instruction unit. In a case where an operation of the printing instruction unit is performed after an operation of inputting a letter with respect to the letter input unit is performed, a user can check what printed matter is obtained through the printed matter image displayed on the device display unit. Therefore, according to the configuration, even in a case where the apparatus is not in a user's hand, a user can experience the operability of a series of processes from letter input to printing execution instruction first hand and the user can check what printed matter is obtained.

In this case, it is preferable that the device further execute manual displaying processing that includes a step of displaying an operation manual of the apparatus by the device display unit.

According to this configuration, a user can be caused to refer to the operation manual of the apparatus without using a paper-medium operation manual.

In this case, it is preferable that the operation unit have a plurality of operating keys and the device further execute operating key describing processing that includes a step of displaying a plurality of operating key images, which are images of the plurality of operating by the device display unit, a step of detecting an operation of one operating key image, out of the plurality of operating key images, by the detection unit, and a step of displaying description of the operating key corresponding to the operated operating key image based on detection of the operation of the operating key image by the device display unit.

In this configuration, as for a desired operating key out of the plurality of operating keys, a user can operate the operating key image corresponding to the operating key to display description of the operating key onto the device display unit. Therefore, according to the configuration, unlike a paper-medium operation manual, a user can check description related to the desired operating key with a simple operation without causing the user to search for a place where the description related to the desired operating key is written.

In this case, it is preferable that the operation unit have the plurality of operating keys, the apparatus further include the apparatus display unit that performs predetermined display by an operation of each of the operating keys, and the device further execute operation procedure displaying processing that includes a step of identifying and displaying the operating key image corresponding to the operating key to be operated out of the plurality of operating keys, among the plurality of operating key images, which are the images of the plurality of operating keys, by the device display unit, and a step of displaying the display unit image, which is the image of the apparatus display unit that has performed the predetermined display by an operation of the operating key to be operated, by the device display unit.

In this configuration, in a state where an operating key to be operated is identified, a user can check which operating key, out of the plurality of operating keys, is to be operated, through the operating key image displayed on the device display unit. In addition, through the display unit image displayed on the device display unit, a user can check what kind of display the apparatus display unit performs in a case where the operating key to be operated is operated. Therefore, according to the configuration, a user can experience operation procedures of the apparatus first hand.

DESCRIPTION OF EMBODIMENTS

Hereinafter, a terminal device E, which is an embodiment of a device according to the invention, and a tape printing apparatus 100, which is a target of handling description performed by the terminal device E, will be described with reference to the accompanying drawings.

Figure 1:
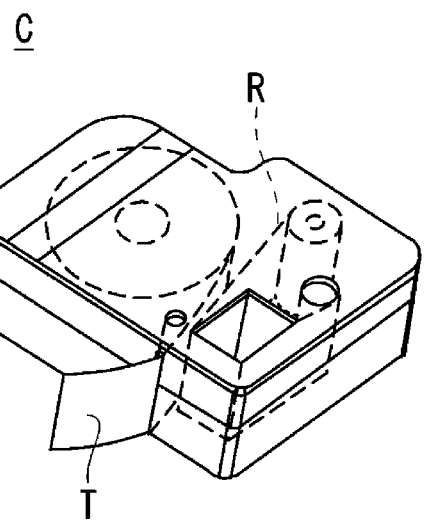
FIG. 1 is an external view of a tape printing apparatus, which is a target of handling description by a terminal device according to an embodiment of the invention.
Figure 1:
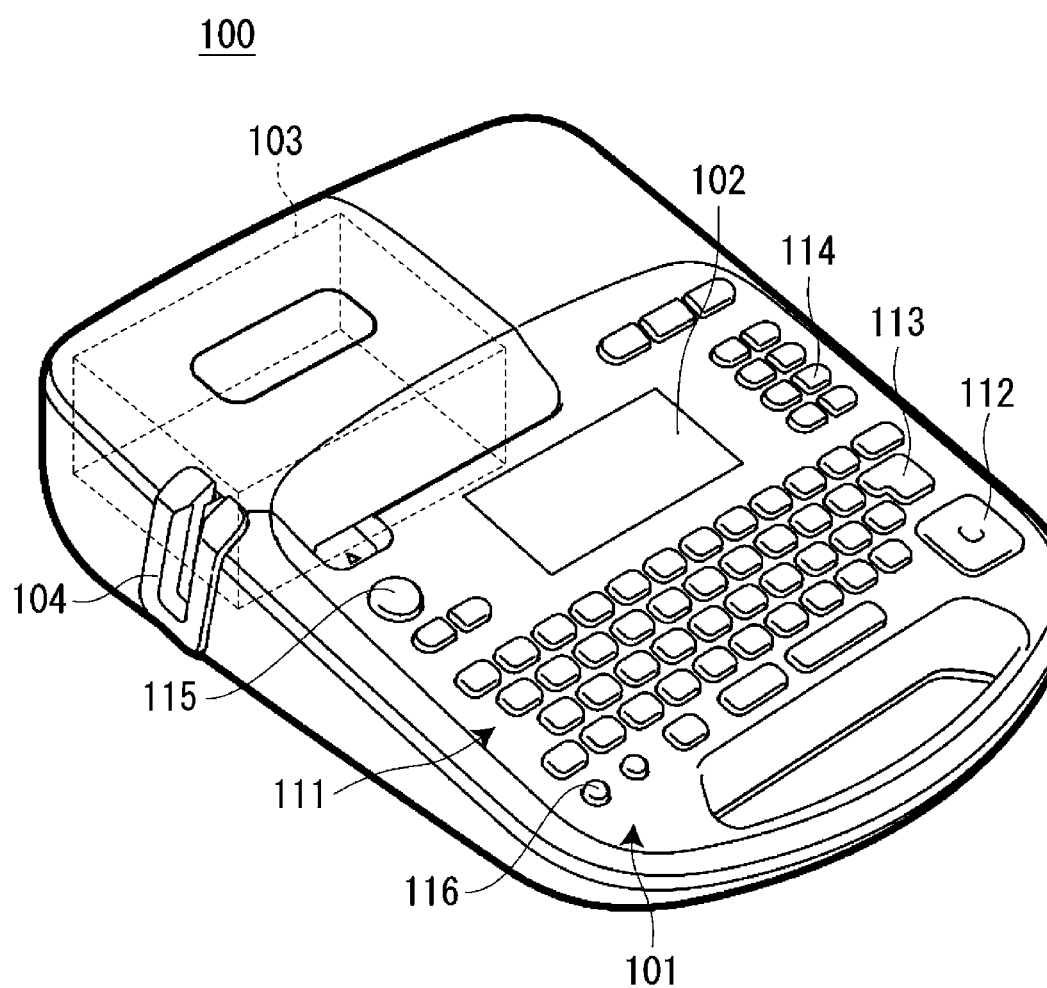

The tape printing apparatus 100 will be described with reference to FIG. 1. The tape printing apparatus 100 includes an operation panel 101, an apparatus display 102, a cartridge mounting portion 103, and a tape outlet 104. In addition, although not illustrated, the tape printing apparatus 100 includes a port in which an alternating current (AC) adapter is plugged. That is, the tape printing apparatus 100 receives power from a commercial power supply via the AC adapter. It is possible for the tape printing apparatus 100 to use a dry cell as a power supply.

The operation panel 101 receives various types of operations from a user. A letter key group 111, a cursor key 112, a selection and line feed key 113, a font selection key 114, a print key 115, and a power supply key 116 are provided on the operation panel 101. The letter key group 111 includes a plurality of keys, and each key receives an operation of inputting each letter such as an alphabet. The cursor key 112 receives an operation of moving a cursor or selection candidates. The selection and line feed key 113 receives an operation of making a choice and an operation of breaking a line. The font selection key 114 receives an operation of selecting a font. The print key 115 receives an operation of instructing printing execution. The power supply key 116 receives an operation of turning a power supply on/off.

The apparatus display 102 performs predetermined display by an operation of each key of the operation panel 101. For example, the apparatus display 102 displays a letter input by an operation of the letter key group 111. A tape cartridge C is detachably mounted on the cartridge mounting portion 103. The tape cartridge C includes tape T and an ink ribbon R. A print head (not illustrated) is provided on the cartridge mounting portion 103. The print head performs thermal printing onto the tape T in the tape cartridge C that is mounted on the cartridge mounting portion 103.

The tape outlet 104 is at a place where the mounted tape cartridge C is reeled out and the tape T on which printing is performed is sent out. A cutter (not illustrated) is provided between the cartridge mounting portion 103 and the tape outlet 104. The cutter cuts the tape T in a width direction. Consequently, a portion of the tape T on which printing is completed is cut out.

Figure 2:
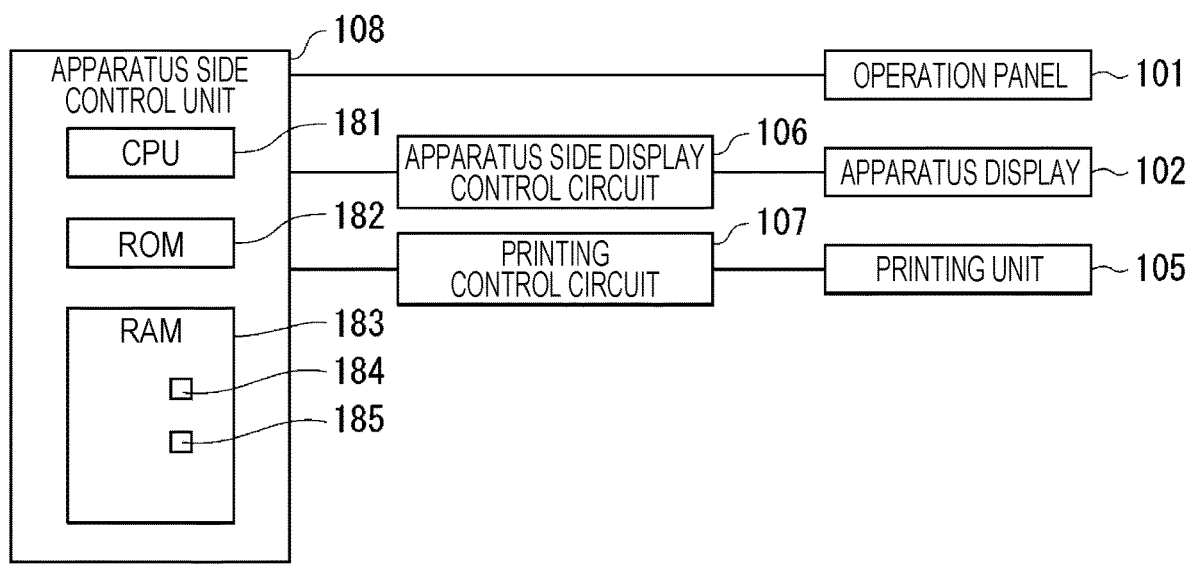
FIG. 2 is a block diagram showing a configuration of the tape printing apparatus.

A configuration of the tape printing apparatus 100 will be described with reference to FIG. 2. The tape printing apparatus 100 includes the operation panel 101, the apparatus display 102, a printing unit 105, an apparatus side display control circuit 106, a printing control circuit 107, and an apparatus side control unit 108.

The printing unit 105 includes a motor for driving the cutter and a motor, which is a driving source for sending the tape T and the ink ribbon R, in addition to the print head and the cutter described above. The apparatus side display control circuit 106 controls the apparatus display 102 based on a control signal from the apparatus side control unit 108. The printing control circuit 107 controls each configuration element of the printing unit 105 based on a control signal from the apparatus side control unit 108.

The apparatus side control unit 108 includes a central processing unit (CPU) 181, a read only memory (ROM) 182, and a random access memory (RAM) 183, and comprehensively controls the entire tape printing apparatus 100.

The CPU 181 reads programs stored in the ROM 182, and executes various types of arithmetic processing using the RAM 183.

A display control program, a print data creation program, and a printing control program are stored in the ROM 182. The display control program is a program for controlling the apparatus display 102 so as to correspond to a code of a letter input by an operation of the operation panel 101. The print data creation program is a program for creating print data (herein, dot pattern data) provided for printing with respect to a letter stored in a text memory 184 (to be described later) in the RAM 183. The printing control program is a program for performing printing by outputting dot pattern data for each dot row in turn to the print head and a sending motor of the printing unit 105.

In addition to a memory in which calculation results from the CPU 181 are temporarily stored, the text memory 184, and a printing buffer 185 are provided in the RAM 183. Text data formed of code data of a letter input from the letter key group 111 of the operation panel 101 is stored in the text memory 184. Dot pattern data corresponding to text data stored in the text memory 184 is developed and stored in the printing buffer 185.

Figure 3:
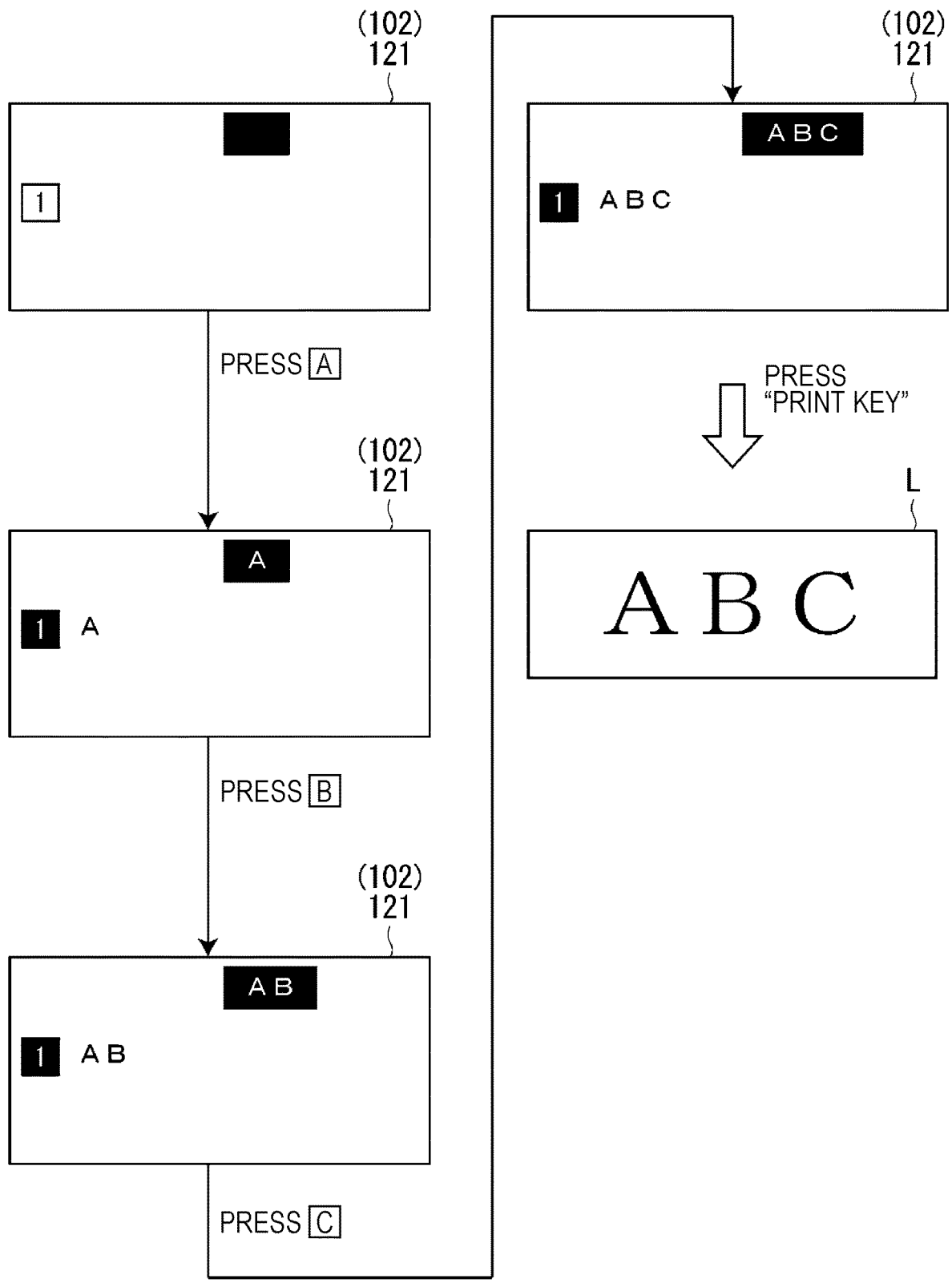
FIG. 3 is a view illustrating screen transition when the tape printing apparatus is operated to create a label, and a printed label.

Operation procedures when the tape printing apparatus 100 is operated to create a label L will be described with reference to FIG. 3. When the power supply key 116 is pressed and power is supplied, the apparatus display 102 displays an input edition screen 121 after displaying an initial screen. Next, when an "A" key in the letter key group 111 is pressed, "A" is displayed onto the input edition screen 121. A print image based on an input letter is displayed on the upper right of the input edition screen 121. Next, when a "B" key in the letter key group 111 is pressed, "AB" is displayed onto the input edition screen 121. When a "C" key in the letter key group 111 is pressed, "ABC" is displayed onto the input edition screen 121. Then, when the print key 115 is pressed, the apparatus side control unit 108 creates print data based on the letters input by the operations of the letter key group 111. The printing unit 105 performs automatic cutting after printing is performed on the tape T based on the created print data. Consequently, the label L on which a character string "ABC" is printed is created.

Figure 4:
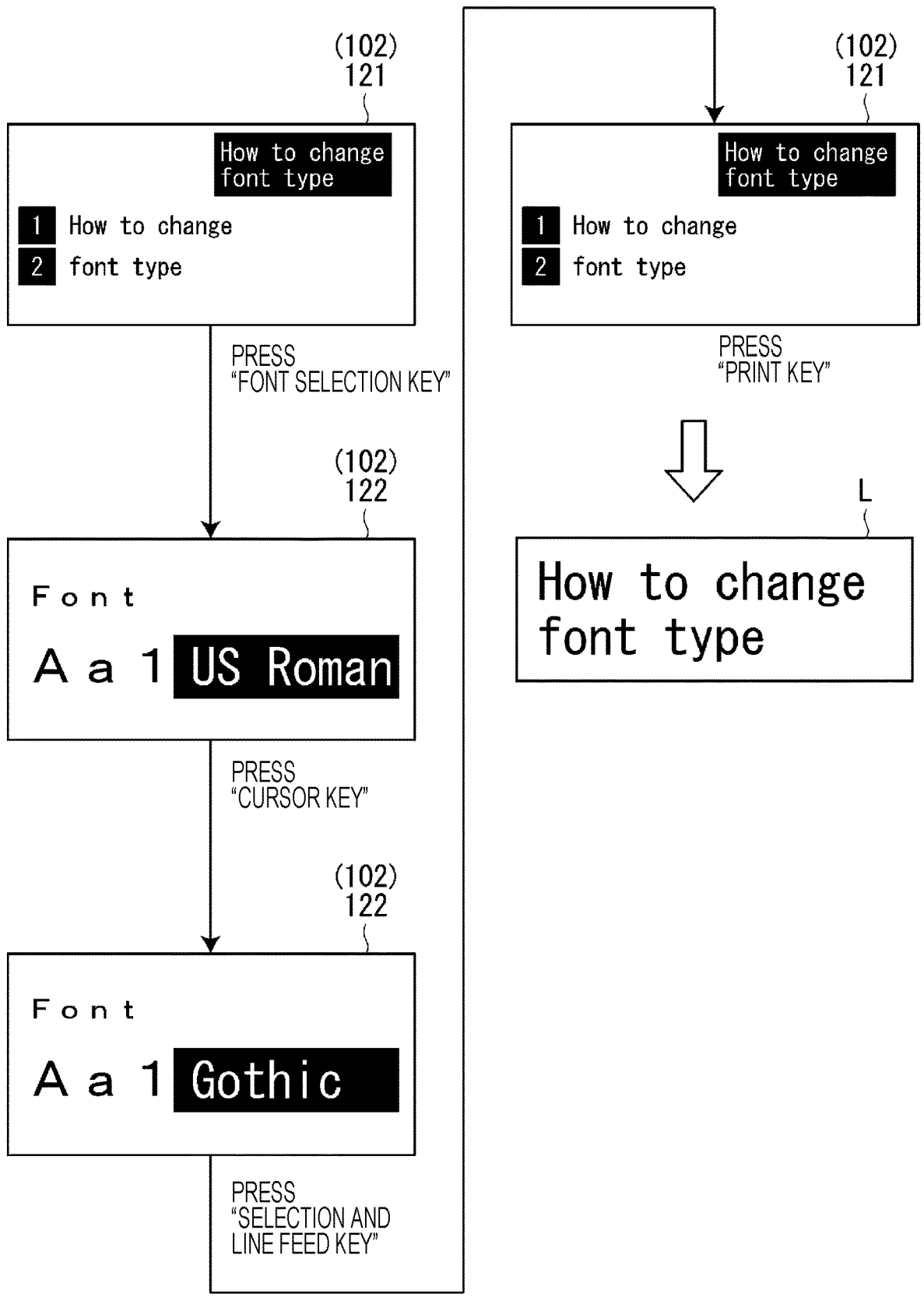
FIG. 4 is a view illustrating screen transition when changing a font of a letter input in the tape printing apparatus, and the printed label.

Operation procedures when the font of a letter input in the tape printing apparatus 100 is changed will be described with reference to FIG. 4. First, desired character strings (herein, "How to change" in the first line and "font type" in the second line) are input by operations of the letter key group 111, and the input character strings are displayed onto the input edition screen 121. When the font selection key 114 is pressed in this state, a font selection screen 122 is displayed onto the apparatus display 102. A font choice is displayed onto the font selection screen 122. When the cursor key 112 is pressed, font choices are switched. When the selection and line feed key 113 is pressed in a state where a desired font choice is displayed on the font selection screen 122, the font is determined and then the input edition screen 121 returns. Then, when the print key 115 is pressed, the apparatus side control unit 108 creates print data based on the selected font. Consequently, the label L on which the desired character strings are printed in the selected font is created.

Figure 5:
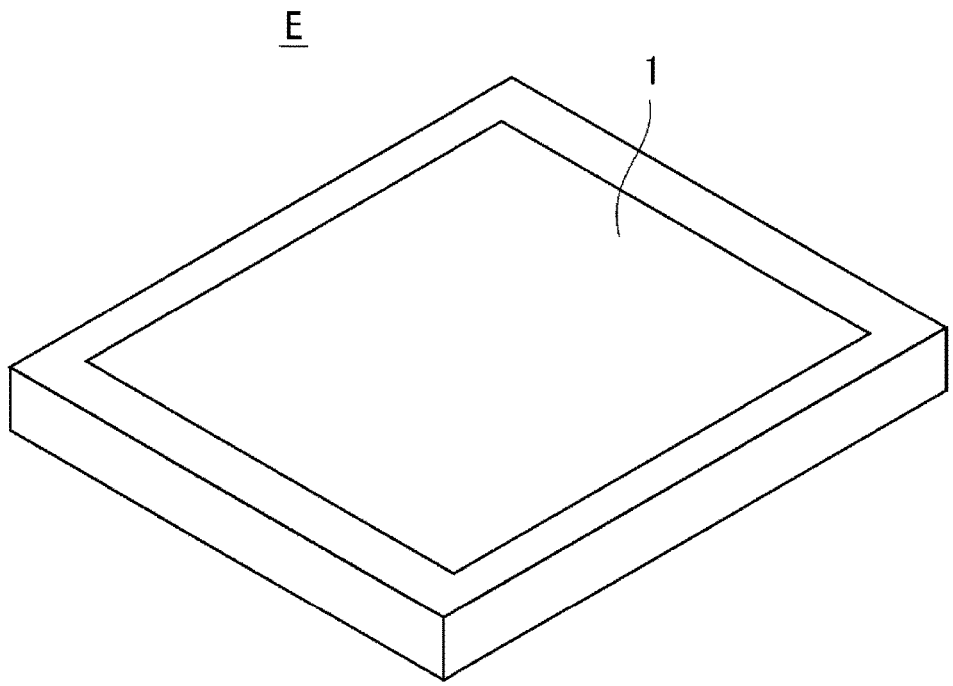
FIG. 5 is an external view of the terminal device.

The terminal device E will be described with reference to FIG. 5. The terminal device E is, for example, a tablet terminal, a smartphone, or a personal computer (PC). The terminal device E includes a touch panel 1. The touch panel 1 displays various types of screens, and receives an operation such as a tap by a user.

Figure 6:
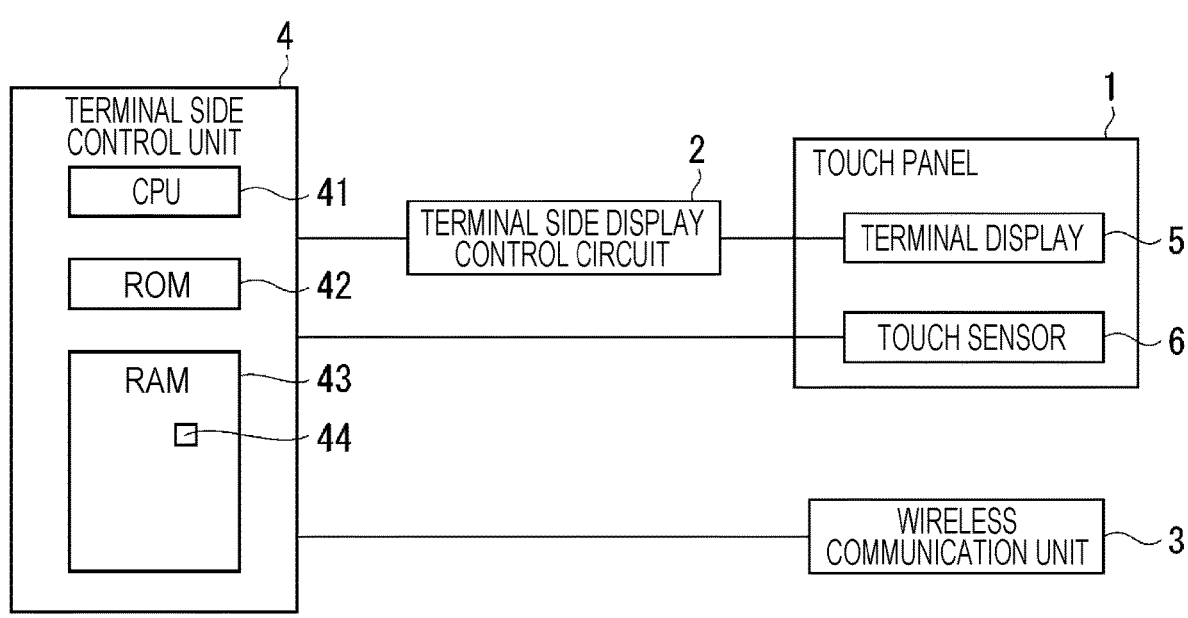
FIG. 6 is a block diagram showing a configuration of the terminal device.

A configuration of the terminal device E will be described with reference to FIG. 6. The terminal device E includes the touch panel 1, a terminal side display control circuit 2, a wireless communication unit 3, and a terminal side control unit 4.

The touch panel 1 includes a terminal display 5 and a touch sensor 6. The terminal display 5 displays various types of screens. The touch sensor 6 detects a place where an operation such as a tap is performed in the screen of the terminal display 5. The terminal side display control circuit 2 controls the terminal display 5 based on a control signal from the terminal side control unit 4.

The wireless communication unit 3 is connected to a communication network via a mobile communication network or a wireless LAN access point and performs wireless communication between servers.

The terminal side control unit 4 includes a CPU 41, a ROM 42, and a RAM 43 and comprehensively controls the entire terminal device E.

The CPU 41 reads programs stored in the ROM 42, and executes various types of arithmetic processing using the RAM 43.

A display control program is stored in the ROM 42. The display control program is a program for controlling the terminal display 5 based on results obtained by the touch sensor 6 detecting an operation such as a tap on the terminal display 5.

An application software for describing the handling of the tape printing apparatus 100 (hereinafter, referred to as a "handling app") is also stored in the ROM 42. The handling app is downloaded, for example, from a predetermined server (website) via the wireless communication unit 3 and is installed in the ROM 42.

In addition to a memory in which calculation results from the CPU 41 are temporarily stored, a text memory 44 is provided in the RAM 43. Text data formed of code data of a letter input by an operation of the terminal display 5 is stored in the text memory 44.

Figure 7:
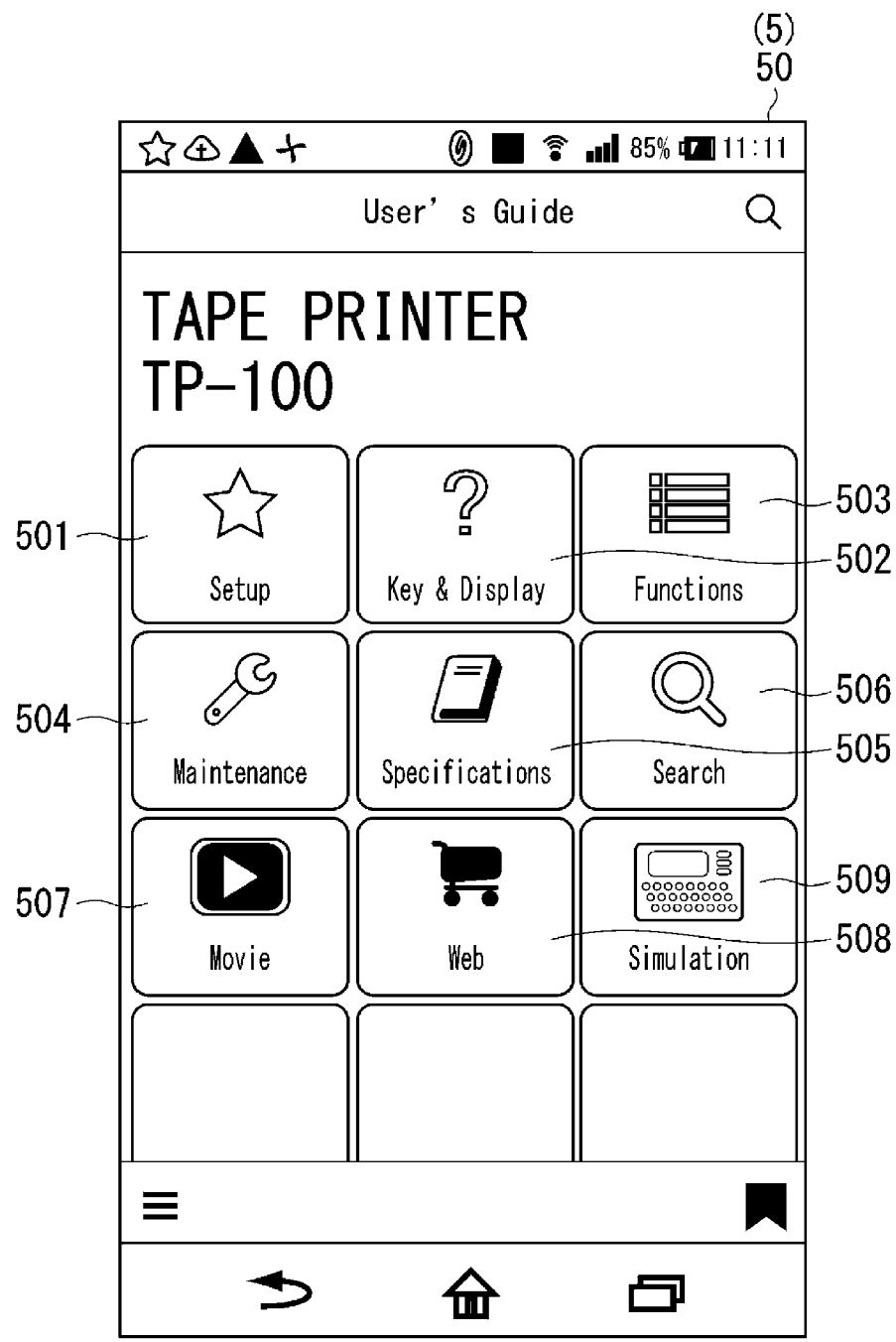
FIG. 7 is a view illustrating a main menu screen displayed by a terminal display of the terminal device.

A main menu screen 50 displayed on the terminal display 5 will be described with reference to FIG. 7. When the handling app is started in the terminal device E, the terminal display 5 displays the main menu screen 50.

The product name (herein, "TAPE PRINTER") and the model number (herein, "TP-100") of the tape printing apparatus 100, which is a target of handling description, and a plurality of icons are displayed onto the main menu screen 50. The plurality of icons include a setup icon 501, a key and display icon 502, a function icon 503, a maintenance icon 504, a specification icon 505, a search icon 506, a video icon 507, a purchase icon 508, and a simulation icon 509. Hereinafter, processing executed by the terminal device E when each icon is tapped will be described in turn.

Figure 8:
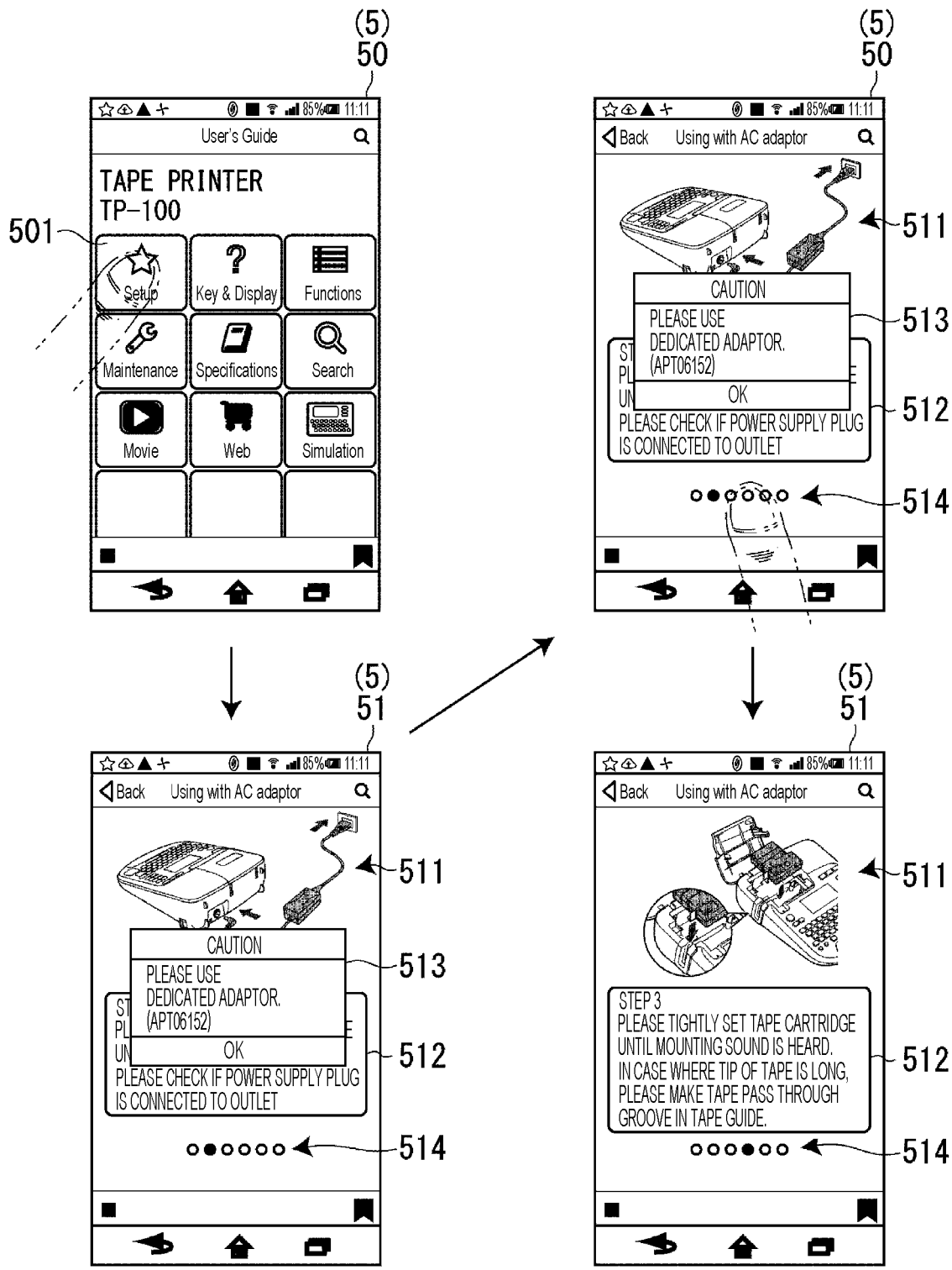
FIG. 8 is a screen transition view for illustrating setup displaying processing executed by the terminal device in a case where a setup icon is tapped on the main menu screen.

Processing executed by the terminal device E in a case where the setup icon 501 is tapped on the main menu screen 50 will be described with reference to FIG. 8. When the setup icon 501 is tapped, the terminal device E initiates setup displaying processing. When the setup displaying processing is initiated, the terminal display 5 displays a setup screen 51.

An operation manual related to a setup method (for example, a connecting method of an AC adapter and a mounting method of the tape cartridge C) of the tape printing apparatus 100 is displayed onto the setup screen 51. A manual drawing 511, a manual sentence 512, and an important information window 513 are displayed onto the setup screen 51. The manual drawing 511 is a portion corresponding to a drawing in the operation manual. The manual sentence 512 is a portion corresponding to a sentence in the operation manual. Particularly important information in the operation manual, which needs to draw user's attention, is displayed onto the important information window 513.

The setup screen 51 is divided into several pages so as to be displayed for each setup procedure. When a page switching button 514 displayed on the setup screen 51 is tapped, the setup screen 51 is switched over to another page. It is possible to switch between pages of the setup screen 51 by sliding (swiping) the setup screen 51 right and left.

Figure 9:
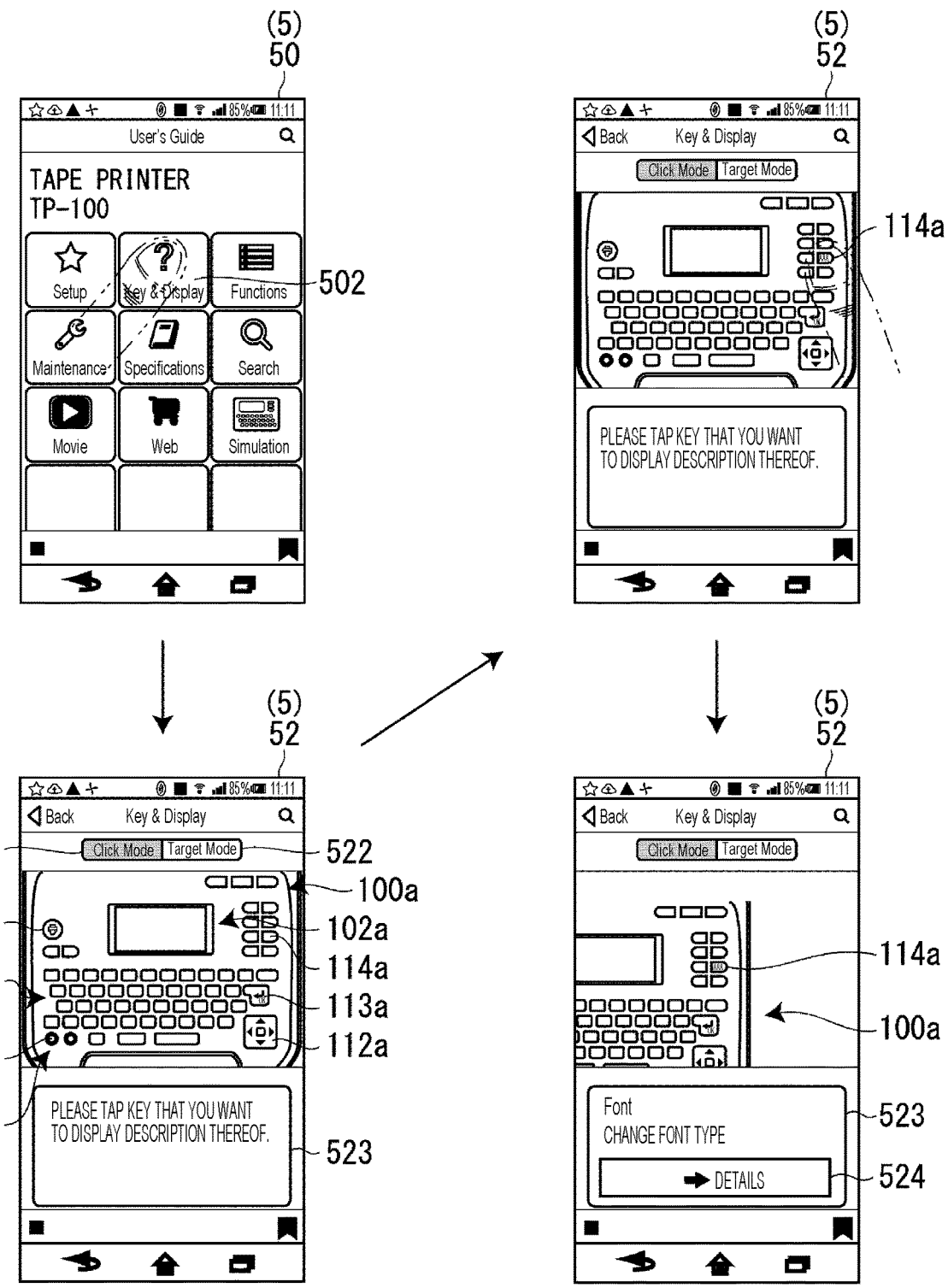
FIG. 9 is a screen transition view for illustrating key and display displaying processing executed by the terminal device in a case where a key and display icon is tapped on the main menu screen.

Processing executed by the terminal device E in a case where the key and display icon 502 is tapped on the main menu screen 50 will be described with reference to FIG. 9 and FIG. 10. As illustrated in FIG. 9, when the key and display icon 502 is tapped, the terminal device E initiates key and display displaying processing. When the key and display displaying processing is initiated, the terminal display 5 displays a key and display screen 52.

As for a desired key out of a plurality of keys provided on the operation panel 101 of the tape printing apparatus 100, the description of the key can be displayed on the key and display screen 52. A click mode button 521, a target mode button 522, an apparatus image 100a, and a description display field 523 in which the description of a key is displayed are displayed onto the key and display screen 52.

The click mode button 521 and the target mode button 522 receive an operation of switching between a click mode and a target mode. Immediately after the key and display icon 502 is tapped on the main menu screen 50, the click mode is set.

A display image 102a and an operation panel image 101a are included in the apparatus image 100a. The display image 102a is an image of the apparatus display 102. The operation panel image 101a is an image of the operation panel 101. A letter key group image 111a, a cursor key image 112a, a selection and line feed key image 113a, a font selection key image 114a, a print key image 115a, and a power supply key image 116a are included in the operation panel image 101a. The letter key group image 111a is an image of the letter key group 111. The cursor key image 112a is an image of the cursor key 112. The selection and line feed key image 113a is an image of the selection and line feed key 113. The font selection key image 114a is an image of the font selection key 114. The print key image 115a is an image of the print key 115. The power supply key image 116a is an image of the power supply key 116. The arrangement of an image of each key on the operation panel image 101a is the same as the arrangement of each key on the operation panel 101.

Hereinafter, specific procedures of displaying the description of a key will be described separately in the click mode and the target mode.

When the key and display icon 502 is tapped and the click mode is set, or when the click mode button 521 is tapped and the mode is switched over to the click mode, a sentence "Please tap a key that you want to display description thereof." is displayed in the description display field 523. Then, when an image (herein, the font selection key image 114a) of a desired key in the operation panel image 101a is tapped, the apparatus image 100a is displayed such that the tapped font selection key image 114a comes in the middle of the screen and a sentence describing the font selection key 114 is displayed in the description display field 523. An additional information instruction button 524 is displayed in the description display field 523. When the additional information instruction button 524 is tapped, more detailed description related to the font selection key 114 is displayed.

Figure 10:
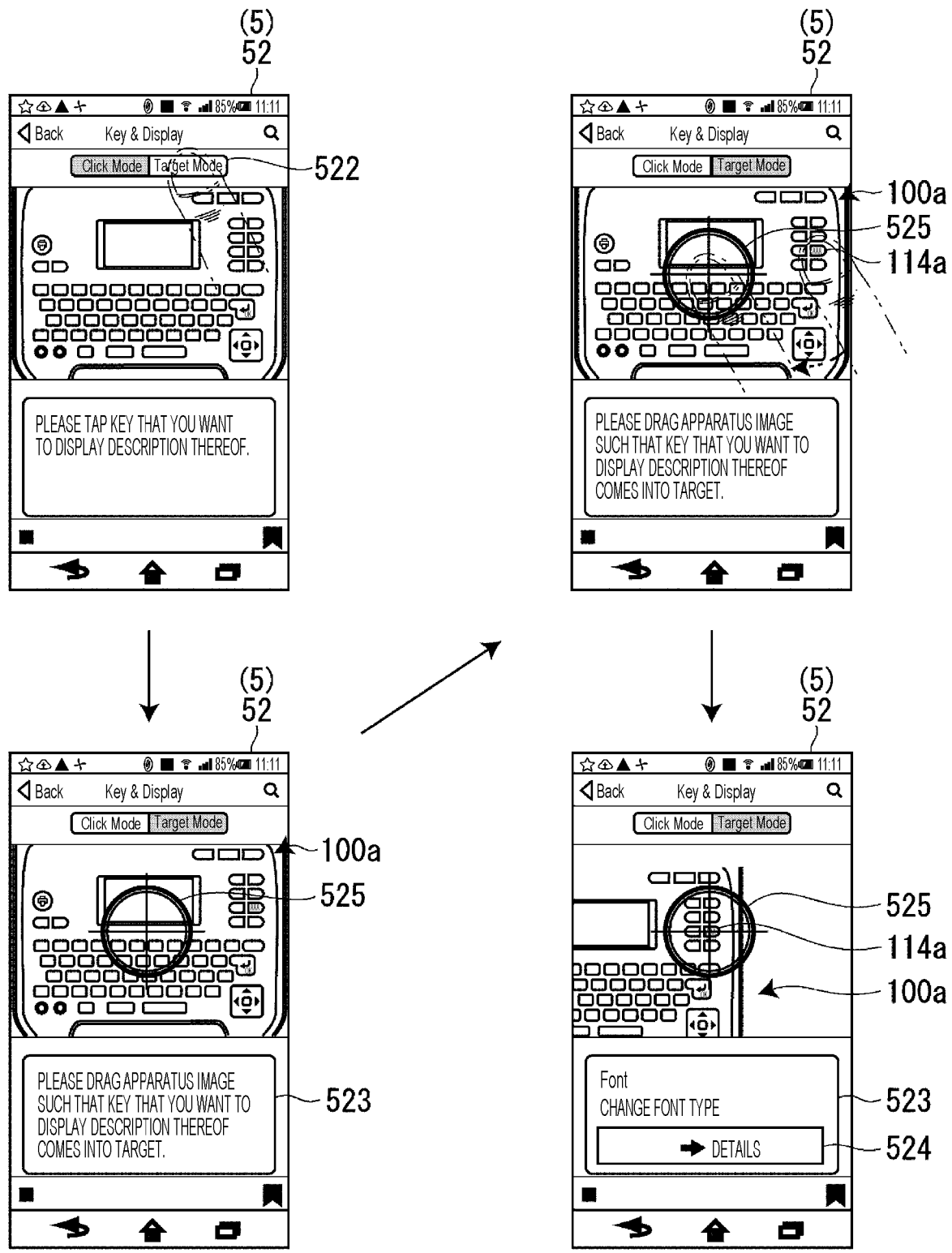
FIG. 10 is a screen transition view for illustrating the key and display displaying processing executed by the terminal device in a case where the key and display icon is tapped on the main menu screen, as in FIG. 9.

When the target mode button 522 is tapped and the mode is switched over to the target mode as illustrated in FIG. 10, a target 525 is displayed so as to be superimposed on the apparatus image 100a and a sentence "Please drag an apparatus image such that a key that you want to display description thereof comes into a target." is displayed in the description display field 523. Then, when the apparatus image 100a is dragged such that an image of a desired key (herein, the font selection key image 114a) in the operation panel image 101a comes into the target 525, a sentence describing the font selection key 114 is displayed in the description display field 523. As in the case of the click mode, the additional information instruction button 524 is displayed in the description display field 523.

Figure 11:
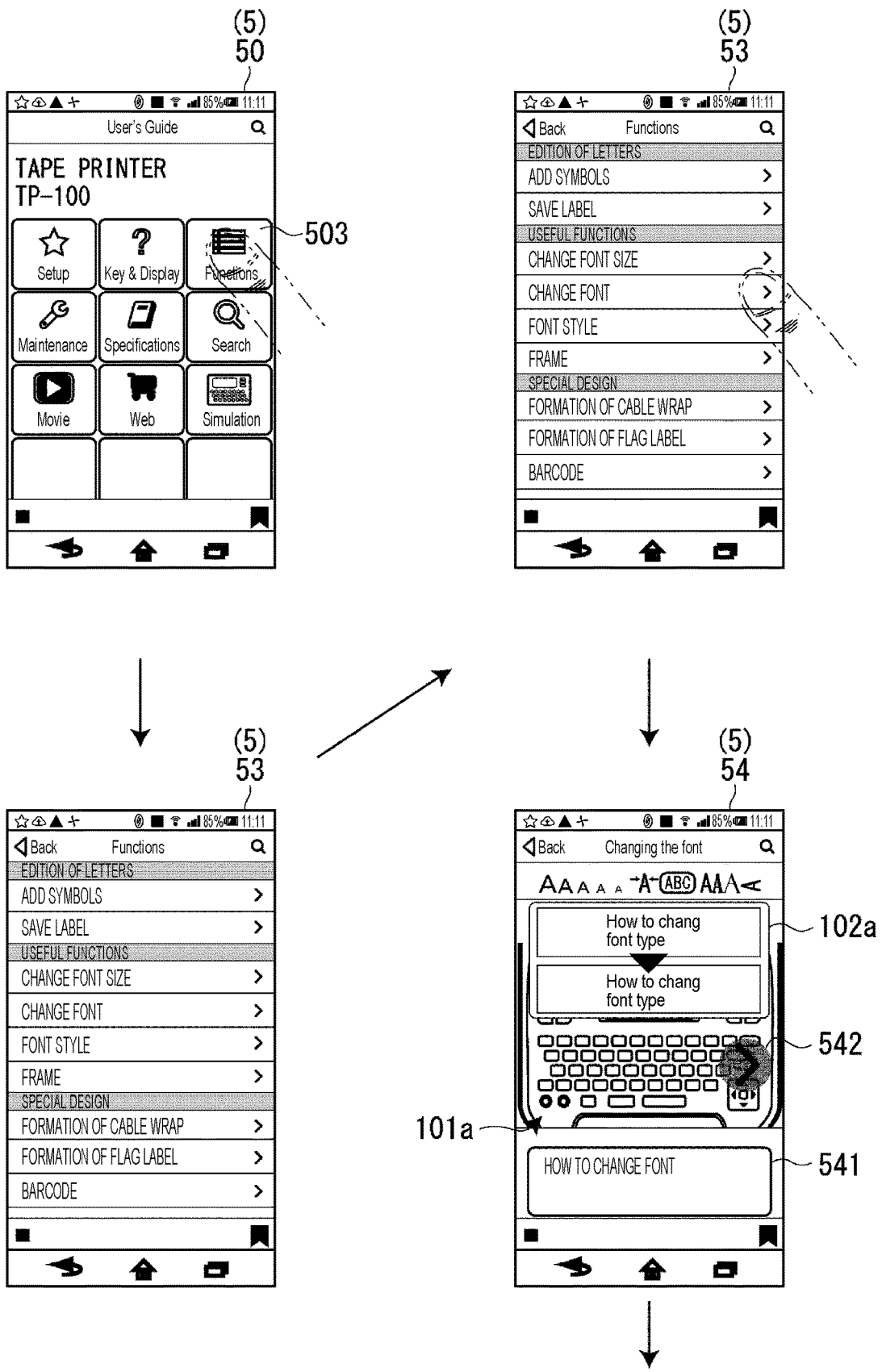
FIG. 11 is a screen transition view for illustrating function displaying processing executed by the terminal device in a case where a function icon is tapped on the main menu screen.

Processing executed by the terminal device E in a case where the function icon 503 is tapped on the main menu screen 50 will be described with reference to FIG. 11 to FIG. 14. When the function icon 503 is tapped as illustrated in FIG. 11, the terminal device E initiates function displaying processing. When the function displaying processing is initiated, the terminal display 5 displays a function selection screen 53.

A plurality of functions of the tape printing apparatus 100 are displayed onto the function selection screen 53 such that the functions can be selected. The plurality of functions are grouped into, for example, "edition of letters", "useful functions", and "special design". When a desired function (herein, "change font") is tapped on the function selection screen 53, the terminal display 5 displays a function display screen 54.

Operation procedures of a function (change font) selected on the function selection screen 53 is displayed onto the function display screen 54. The display image 102a, the operation panel image 101a, a procedure display field 541, a next page button 542, and a previous page button 543 (refer to FIG. 12) are displayed onto the function display screen 54. A sentence showing operation procedures is displayed in the procedure display field 541. The next page button 542 is a button for switching the page of the function display screen 54 over to the next page. The previous page button 543 is a button for switching the page of the function display screen 54 over to the previous page.

Figure 12:
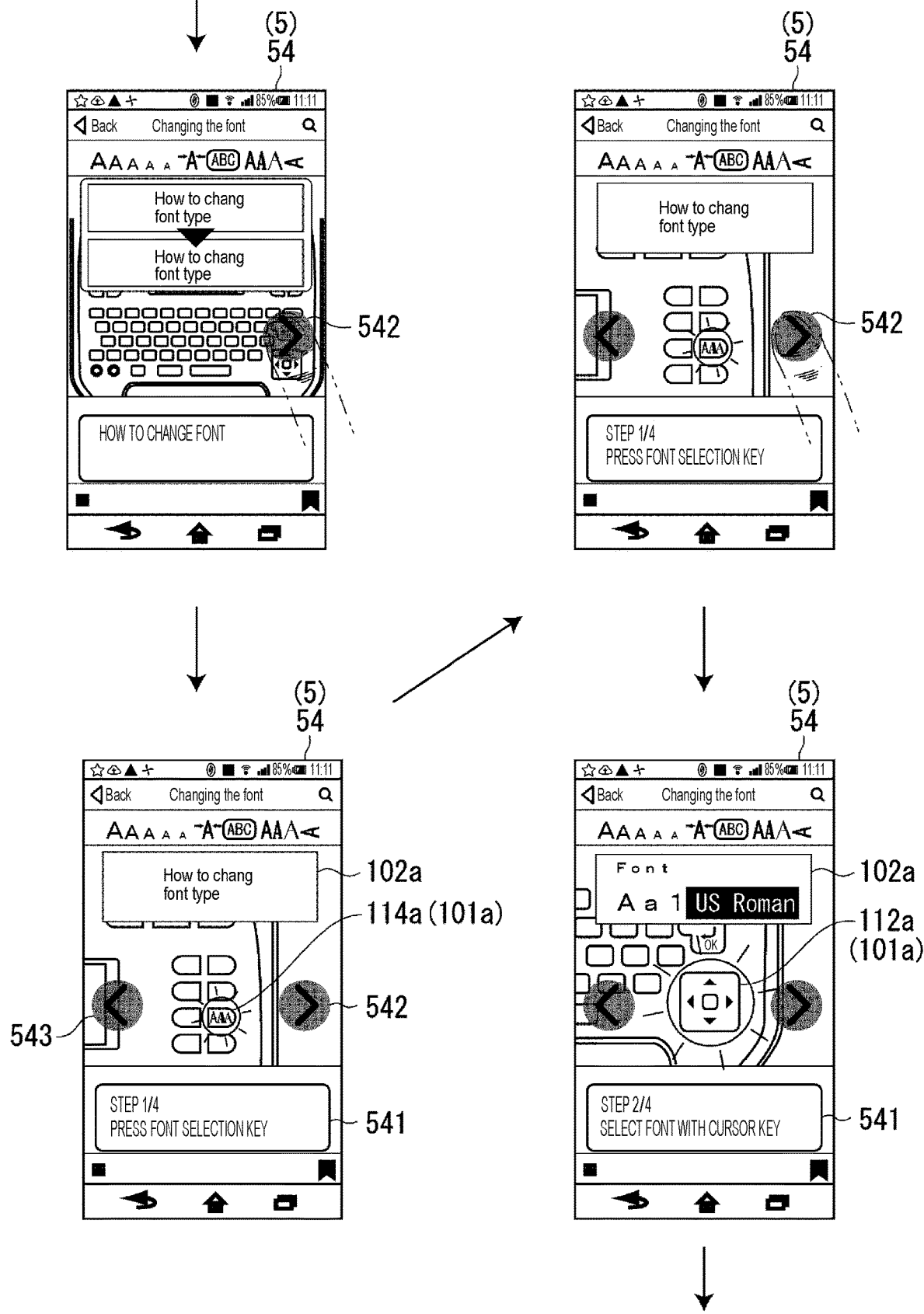
FIG. 12 is a screen transition view following FIG. 11.

The content of a selected function (change font) is displayed onto the first page of the function display screen 54. That is, the display image 102a, in which a print image before a font change and a print image after a font change are displayed, is displayed onto the first page of the function display screen 54. In addition, a sentence "how to change a font" is displayed in the procedure display field 541. When the next page button 542 is tapped on the first page of the function display screen 54 as illustrated in FIG. 12, the second page of the function display screen 54 is displayed. Specific operation procedures related to "change font" are displayed after the second page of the function display screen 54.

The display image 102a, in which the input edition screen 121 (refer to FIG. 4) is displayed, is displayed onto the second page of the function display screen 54. The vicinity of the font selection key image 114a, which is an image of the font selection key 114, is enlarged and displayed as the operation panel image 101a. In the image, the font selection key image 114a is displayed so as to flash. In addition, a sentence "Press a font selection key" is displayed in the procedure display field 541. When the next page button 542 is tapped on the second page of the function display screen 54, the third page of the function display screen 54 is displayed.

Figure 13:
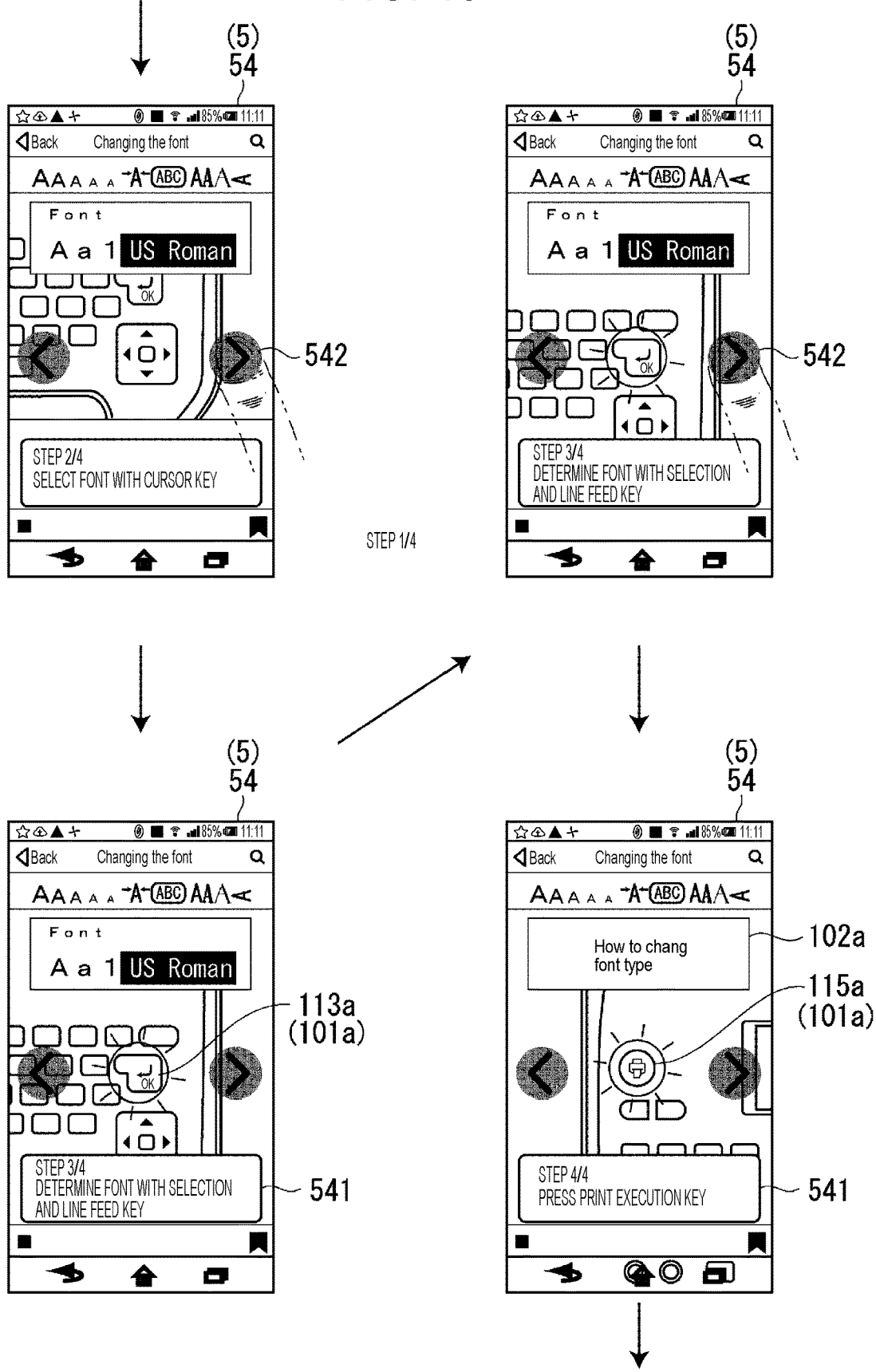
FIG. 13 is a screen transition view following FIG. 12.

The display image 102a, in which the font selection screen 122 (refer to FIG. 4) is displayed, is displayed onto the third page of the function display screen 54. The vicinity of the cursor key image 112a, which is the image of the cursor key 112, is enlarged and displayed as the operation panel image 101a. In the image, the cursor key image 112a is displayed so as to flash. A sentence "Select a font with the cursor key" is displayed in the procedure display field 541. When the next page button 542 is tapped on the third page of the function display screen 54 as illustrated in FIG. 13, the fourth page of the function display screen 54 is displayed.

The vicinity of the selection and line feed key image 113a, which is the image of the selection and line feed key 113, is enlarged and displayed on the fourth page of the function display screen 54 as the operation panel image 101a. In the image, the selection and line feed key image 113a is displayed so as to flash. A sentence "Determine a font with the selection and line feed key" is displayed in the procedure display field 541. When the next page button 542 is tapped on the fourth page of the function display screen 54, the fifth page of the function display screen 54 is displayed.

Figure 14:
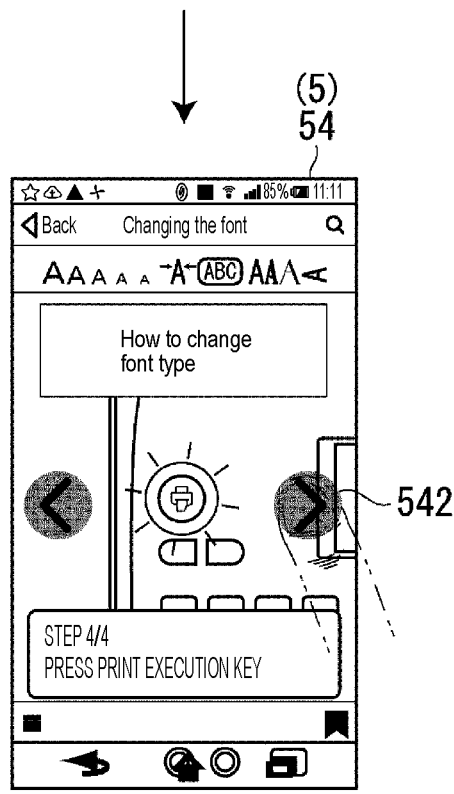
FIG. 14 is a screen transition view following FIG. 13.
Figure 14:
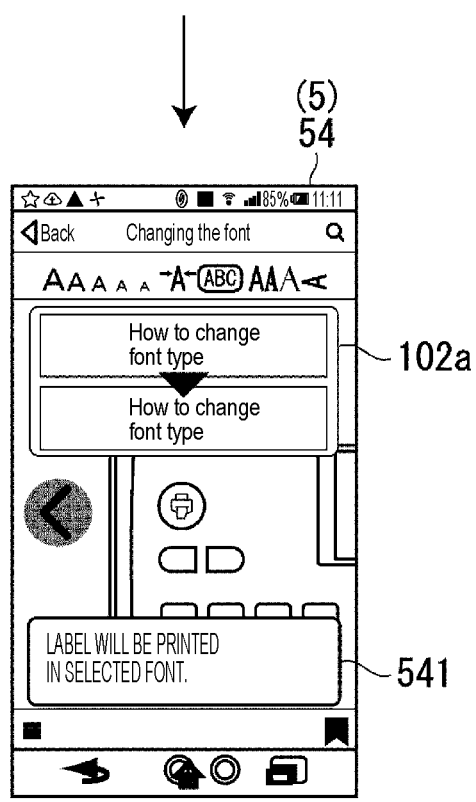

The display image 102a returned from the font selection screen 122 to the input edition screen 121 (refer to FIG. 4) is displayed onto the fifth page of the function display screen 54. The vicinity of the print key image 115a, which is the image of the print key 115, is enlarged and displayed as the operation panel image 101a. In the image, the print key image 115a is displayed so as to flash. A sentence "Press the print key" is displayed in the procedure display field 541. When the next page button 542 is tapped on the fifth page of the function display screen 54 as illustrated in FIG. 14, the sixth page of the function display screen 54 is displayed.

That is, the display image 102a, in which a print image before a font change and a print image after a font change are displayed, is displayed onto the sixth page of the function display screen 54, as in the first page. A sentence "A label is printed in the selected font" is displayed in the procedure display field 541.

As described above, by viewing each page of the function display screen 54, a user learns that a font needs to be selected with the cursor key 112 after pressing the font selection key 114 and the print key 115 needs to be pressed after determining a font with the selection and line feed key 113 in order to print letters in a desired font.

When the maintenance icon 504 is tapped on the main menu screen 50, the terminal device E initiates maintenance displaying processing. When the maintenance displaying processing is initiated, the terminal display 5 displays a screen showing a maintenance method of the tape printing apparatus 100.

When the specification icon 505 is tapped on the main menu screen 50, the terminal device E initiates specification displaying processing. When the specification displaying processing is initiated, the terminal display 5 displays a screen showing the specification of the tape printing apparatus 100.

When the search icon 506 is tapped on the main menu screen 50, the terminal device E initiates search processing. When the search processing is initiated, the terminal display 5 displays a search window, and when a word is input into the search window, information related to the input word is displayed. It is preferable that incremental search be possible in the search window.

When the video icon 507 is tapped on the main menu screen 50, the terminal device E initiates the video displaying processing. When the video displaying processing is initiated, the terminal display 5 displays a video related to product introduction of the tape printing apparatus 100.

When the purchase icon 508 is tapped on the main menu screen 50, the terminal device E initiates purchase site displaying processing. When the purchase site displaying processing is initiated, the terminal display 5 displays a website where a user can purchase the tape printing apparatus 100 and products (for example, the tape cartridge C) related to the tape printing apparatus 100.

Figure 15:
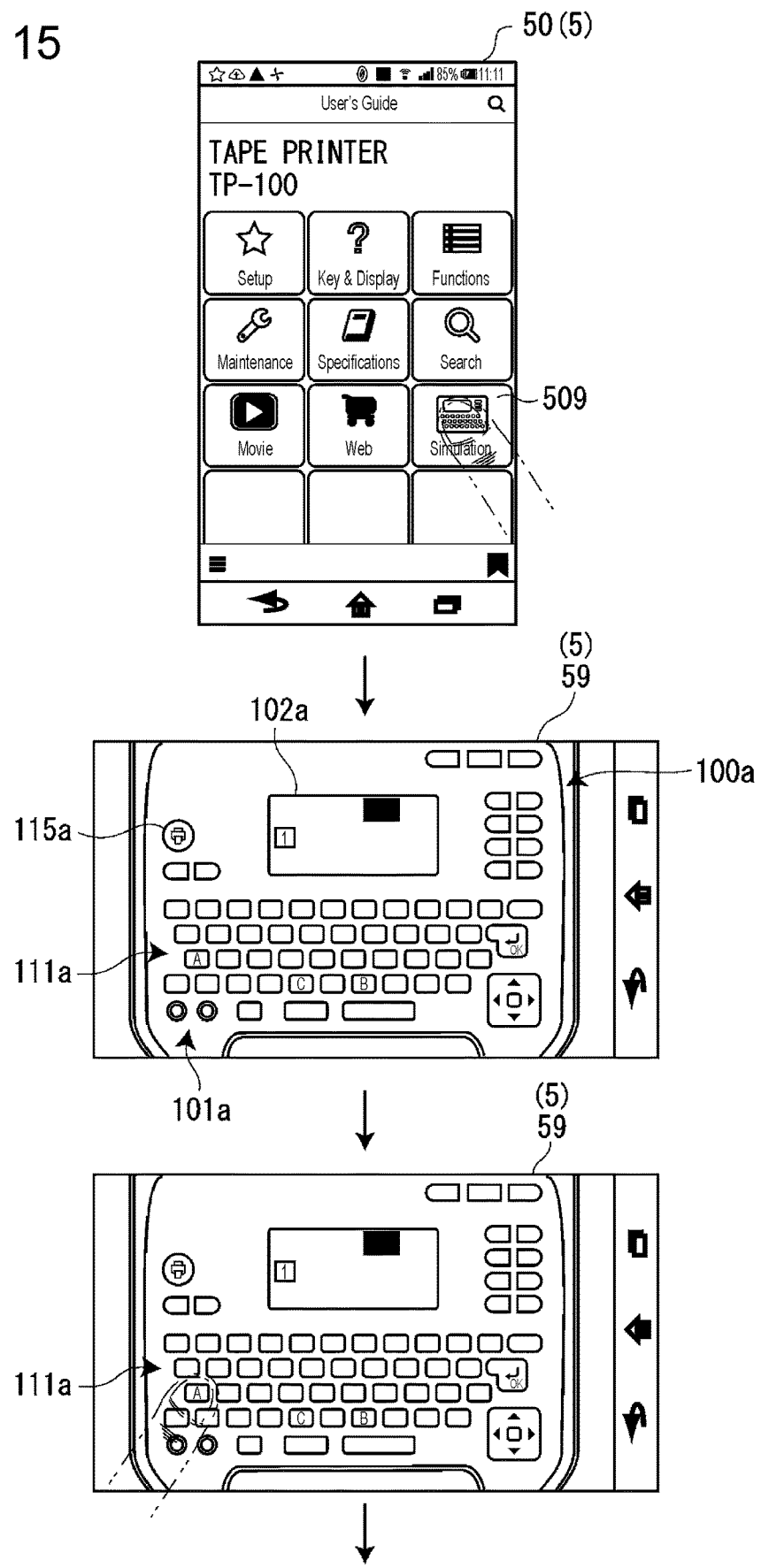
FIG. 15 is a screen transition view for illustrating simulation processing executed by the terminal device in a case where a simulation icon is tapped on the main menu screen.

Processing executed by the terminal device E in a case where the simulation icon 509 is tapped on the main menu screen 50 will be described with reference to FIG. 15 to FIG. 17. When the simulation icon 509 is tapped as illustrated in FIG. 15, the terminal device E initiates simulation processing. When the simulation processing is initiated, the terminal display 5 displays a simulation screen 59.

The apparatus image 100a is displayed onto the simulation screen 59. The operation panel image 101a included in the apparatus image 100a displayed on the simulation screen 59 receives an operation from a user. For example, the letter key group image 111a receives an operation of inputting a letter. The print key image 115a receives an operation of instructing creation of a label image La (refer to FIG. 17), which is an image of the label L. The display image 102a included in the apparatus image 100a displayed on the simulation screen 59 displays a letter input by an operation of the letter key group image 111a.

Figure 16:
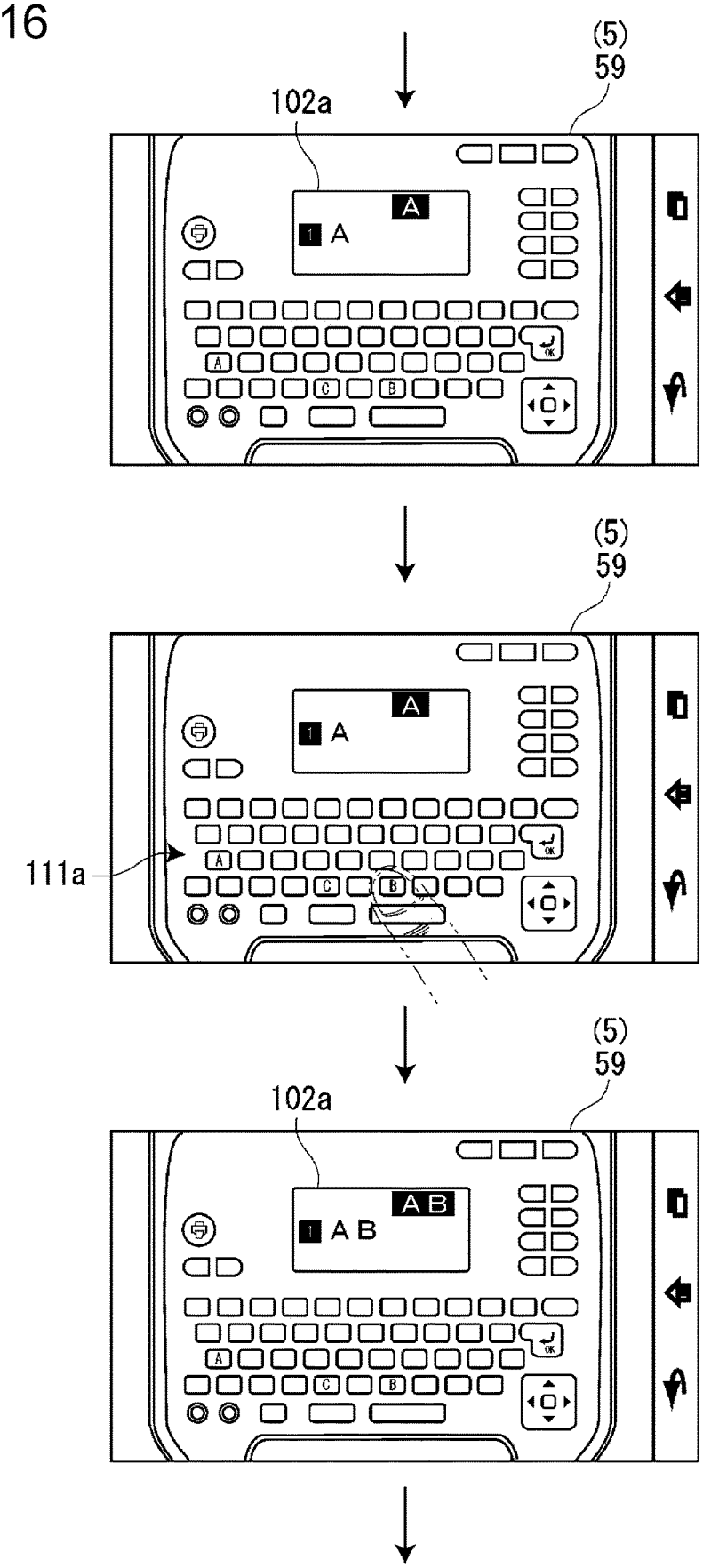
FIG. 16 is a screen transition view following FIG. 15.
Figure 17:
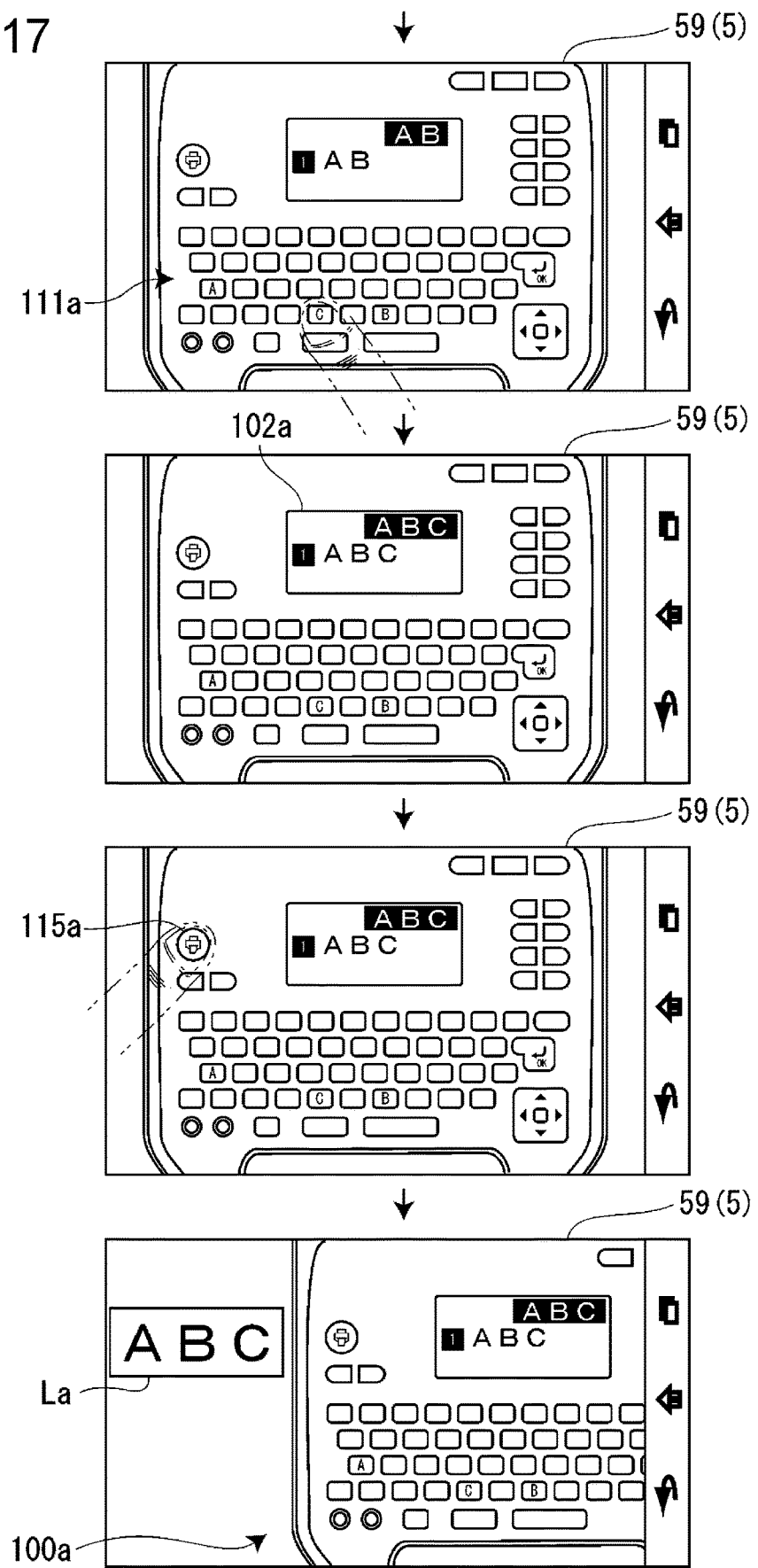
FIG. 17 is a screen transition view following FIG. 16.

For example, when the image of the "A" key in the letter key group image 111a is tapped on the simulation screen 59, the display image 102a displaying "A" is displayed as illustrated in FIG. 16. Next, when the image of the "B" key in the letter key group image 111a is tapped, the display image 102a displaying "AB" is displayed. Next, when the image of the "C" key in the letter key group image 111a is tapped as illustrated in FIG. 17, the display image 102a displaying "ABC" is displayed.

When the print key image 115a is tapped on the simulation screen 59, the label image La on which a character string "ABC" is printed is displayed on the simulation screen 59 with the apparatus image 100a.

The terminal device E of the embodiment executes simulation processing. In the simulation processing, the terminal display 5 displays the operation panel image 101a, which is an image of the operation panel 101 of the tape printing apparatus 100. The touch sensor 6 detects an operation of the operation panel image 101a. The terminal display 5 displays, for example, the label image La as an operation image, which is an image resulted from operation of the tape printing apparatus 100 by an operation of the operation panel 101 based on the detection of an operation of the operation panel image 101a.

In this configuration, a user can perform an operation of the operation panel image 101a displayed on the terminal display 5 of the terminal device E as in the case of performing an operation of the operation panel 101 in the tape printing apparatus 100. In addition, through an operation image displayed on the terminal display 5, a user can check how the tape printing apparatus 100 operates in a case where an operation of the operation panel 101 is performed. Therefore, according to the configuration, even in a case where the tape printing apparatus 100 is not in a user's hand, a user can experience the usability of the tape printing apparatus 100 first hand.

The letter key group image 111a, which is the image of the letter key group ill and receives an operation of inputting a letter, is included in the operation panel image 101a displayed by the terminal display 5 in the terminal device E of the embodiment. The operation image displayed by the terminal display 5 is an image of the apparatus display 102, and includes the display image 102a in which a letter input by an operation of the letter key group image 111a is displayed.

In this configuration, a user can perform an operation of inputting a letter with respect to the letter key group image 111a displayed on the terminal display 5 of the terminal device E as in the case of performing an operation of inputting a letter with respect to the letter key group 111 in the tape printing apparatus 100. In a case where an operation of inputting a letter with the letter key group 111 in the tape printing apparatus 100 is performed, a user can check how the input letter is displayed on the apparatus display 102 through the display image 102a displayed on the terminal display 5. Therefore, according to the configuration, even in a case where the tape printing apparatus 100 is not in a user's hand, a user can experience the operability of inputting a letter with respect to the tape printing apparatus 100 first hand.

The print key image 115a, which is the image of the print key 115 and receives an operation of instructing creation of the label image La, is included in the operation panel image 101a displayed by the terminal display 5 in simulation processing, in the terminal device E of the embodiment. The label image La created by an operation with respect to the print key image 115a is included in an operation image displayed by the terminal display 5.

In this configuration, a user can perform an operation of the print key image 115a displayed on the terminal display 5 of the terminal device E as in the case of performing an operation of the print key 115 in the tape printing apparatus 100. In a case where an operation of the print key 115 is performed after performing an operation of inputting a letter with the letter key group 111 in the tape printing apparatus 100, a user can check what label L is obtained, through the label image La displayed on the terminal display 5. Therefore, according to the configuration, even in a case where the tape printing apparatus 100 is not in a user's hand, a user can experience the operability of a series of processes from letter input to printing execution instruction first hand and the user can check what label L is obtained.

It is preferable that the terminal device E acquire information related to printing by the tape printing apparatus 100, which is a target of handling description, in advance, and display the label image La based on the information. The information related to printing is, for example, information related to print resolution of the tape printing apparatus 100 and information related to a font stored in the tape printing apparatus 100. Consequently, the label image La having a small difference from the label L printed by the tape printing apparatus 100 can be displayed.

The terminal device E of the embodiment further executes setup displaying processing. In the setup displaying processing, the terminal display 5 displays an operation manual related to a setup method of the tape printing apparatus 100.

According to this configuration, a user can be caused to refer to the operation manual related to the setup method of the tape printing apparatus 100 without using a paper-medium operation manual. For this reason, it is not necessary to attach a paper-medium operation manual related to the setup method of the tape printing apparatus 100 for each product.

The operation manual displayed by the terminal display 5 is not limited to the operation manual related to the setup method of the tape printing apparatus 100, and may be, for example, an operation manual related to an operating method of the tape printing apparatus 100, such as an input and edit operation of letters.

The terminal device E of the embodiment further executes key and display displaying processing. In the key and display displaying processing, the terminal display 5 displays images of a plurality of keys, such as the letter key group image 111a and the font selection key image 114a. The touch sensor 6 detects an operation of an image of one key out of the plurality of keys images, that is, a tapping operation of the image of the key, or a dragging operation of putting the image of the key into the target 525. The terminal display 5 displays description of the key corresponding to the image of the operated key based on the detection of an operation of the image of the key.

In this configuration, as for a desired key out of the plurality of keys, a user can operate an image of the key corresponding to the key to display description of the key onto the terminal display 5. Therefore, according to the configuration, unlike a paper-medium operation manual, a user can check description related to a desired key with a simple operation without causing the user to search for a place where the description related to the desired key is written.

The terminal device E of the embodiment further executes function displaying processing. In the function displaying processing, the terminal display 5 identifies and displays an image of a key corresponding to the key to be operated out of a plurality of keys, among a plurality of images of keys, such as the letter key group image 111a and the font selection key image 114a. Then, the terminal display 5 displays the display image 102a, which is the image of the apparatus display 102 that performs predetermined display, by an operation of the key to be operated.

In this configuration, in a state where a key to be operated is identified, a user can check which key, out of the plurality of keys, is to be operated, through an image of the key displayed on the terminal display 5. In addition, through the display image 102a displayed on the terminal display 5, a user can check what kind of display the apparatus display 102 performs in a case where the key to be operated is operated. Therefore, according to the configuration, a user can experience operation procedures of the tape printing apparatus 100 first hand. That is, a user can grasp the operation procedures of the tape printing apparatus 100 as if a person who gives description of the tape printing apparatus 100 (for example, a clerk in a home appliance store) actually describes the tape printing apparatus 100 while operating the tape printing apparatus.

A form in which an image of a key to be operated is identified and displayed is not limited to a form in which the vicinity of the image of the key is enlarged or the image of the key flashes, and may be, for example, a form in which the image of the key is surrounded with a frame.

In the embodiment, the handling app installed in the terminal device E causes the terminal device E to execute each piece of processing (each step) described above. As described above, the handling app may be recorded in a computer readable recording medium (for example, a CD-ROM), in addition to being downloadable from a predetermined website.

The terminal display 5 is an example of a "device display unit". The touch sensor 6 is an example of a "detection unit". The operation panel 101 is an example of an "operation unit". The operation panel image 101a is an example of an "operation unit image". The apparatus display 102 is an example of an "apparatus display unit". The display image 102a is an example of a "display unit image". The letter key group 111 is an example of a "letter input unit". The letter key group image 111a is an example of a "letter input unit image". The print key 115 is an example of a "printing instruction unit". The print key image 115a is an example of a "printing instruction unit image". The label L is an example of a "printed matter". The label image La is an example of a "printed matter image". A key is an example of an "operator operating key". An image of a key is an example of an "operating key image". Setup displaying processing is an example of "manual displaying processing". Key and display displaying processing is an example of "operating key describing processing". Function displaying processing is an example of "operation procedure displaying processing".

The invention is not limited to the embodiment described above, and can adopt various configurations without departing from the spirit of the invention. For example, the embodiment can be changed into the following form.

An apparatus, which is a target of handling description, is not limited to the tape printing apparatus 100, and for example, may be another printing apparatus, an audio visual (AV) device, and an information processing apparatus such as a PC.

REFERENCE SIGNS LIST

5 terminal display
6 touch sensor
100 tape printing apparatus
101 operation panel
101a operation panel image
E terminal device

The invention claimed is:

1. A method of apparatus handling description by a device executing simulation processing, the method comprising:
   displaying an operation unit image, which is an image of an operation unit of an apparatus including the operation unit, by a device display unit, wherein
      the operation unit image includes a plurality of operating key images, and
      the plurality of operating key images are images of a plurality of operating keys of the operation unit,
   detecting an operation of one of the plurality of operating key images of the operation unit image by a detection unit, and
   displaying an operation image, which is an image resulted from an operation of the apparatus by an operation of the operation unit based on the detection of the operation of one of the plurality of operating key images, by the device display unit, wherein the apparatus is different from the device executing the simulation processing.

2. The method of apparatus handling description by the device according to claim 1, wherein
   the operation unit has a letter input unit that receives an operation of inputting a letter,
   the apparatus further includes an apparatus display unit that displays the letter input by the operation of the letter input unit,
   in the step of displaying the operation unit image, a letter input unit image, which is an image of the letter input unit and receives the operation of inputting the letter, is included in the operation unit image displayed by the device display unit, and
   in the step of displaying the operation image, a display unit image, which is an image of the apparatus display unit and in which the letter input by the operation of the letter input unit image is displayed, is included in the operation image displayed by the device display unit.

3. The method of apparatus handling description by the device according to claim 2, wherein
   the operation unit further has a printing instruction unit that receives an operation of instructing printing execution,
   the apparatus further includes a printing unit that prints the letter input by the operation of the letter input unit by an operation of the printing instruction unit,
   in the step of displaying the operation unit image, a printing instruction unit image, which is an image of the printing instruction unit and receives an operation of instructing creation of a printed matter image that is an image of a printed matter on which the letter is printed by the printing unit, is included in the operation unit image displayed by the device display unit, and
   in the step of displaying the operation image, the printed matter image, which is created by the operation of the printing instruction unit image, is included in the operation image displayed by the device display unit.

4. The method of apparatus handling description by the device according to claim 1, wherein the device further executes manual displaying processing that includes a step of displaying an operation manual of the apparatus by the device display unit.

5. The method of apparatus handling description by the device according to claim 1, wherein
the method further comprises displaying description of an operating key corresponding to the operated one of the plurality of operating key images based on the detection of the operation of the one of the plurality of operating key images by the device display unit.

6. The method of apparatus handling description by the device according to claim 1, wherein
the apparatus further includes the apparatus display unit that performs predetermined display by an operation of each of the plurality of operating keys, and
the device further executes operation procedure displaying processing that includes
identifying and displaying an operating key image corresponding to the operating key to be operated out of the plurality of operating keys, among the plurality of operating key images, which are the images of the plurality of operating keys, by the device display unit, and
displaying the display unit image, which is the image of the apparatus display unit that has performed the predetermined display by an operation of the operating key to be operated, by the device display unit.

7. A device comprising:
a device display unit that displays an operation unit image, which is an image of an operation unit of an apparatus including the operation unit, and an operation image, which is an image resulted from an operation of the apparatus by an operation of the operation unit, wherein
the operation unit image includes a plurality of operating key images, and
the plurality of operating key images are images of a plurality of operating keys of the operation unit; and
a detection unit that detects an operation of one of the plurality of operating key images of the operation unit image,
wherein the device display unit displays the operation image when the detection unit detects the operation of one of the plurality of operating key images in a state where the operation unit image is displayed by the device display unit, and
wherein the apparatus is different from the device executing simulation processing.

8. A non-transitory computer-readable medium having stored thereon computer-executable instructions that, when executed by a processor, cause the processor to execute each step in the method of apparatus handling description by a device according to claim 1.

* * * * *